J. P. FRIZELL.
Method of Compressing Air.
No. 199,819. Patented Jan. 29, 1878.
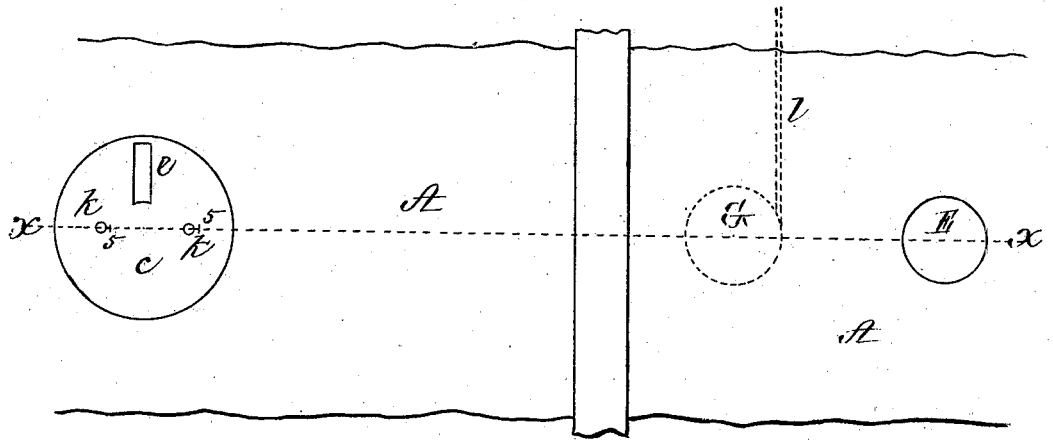
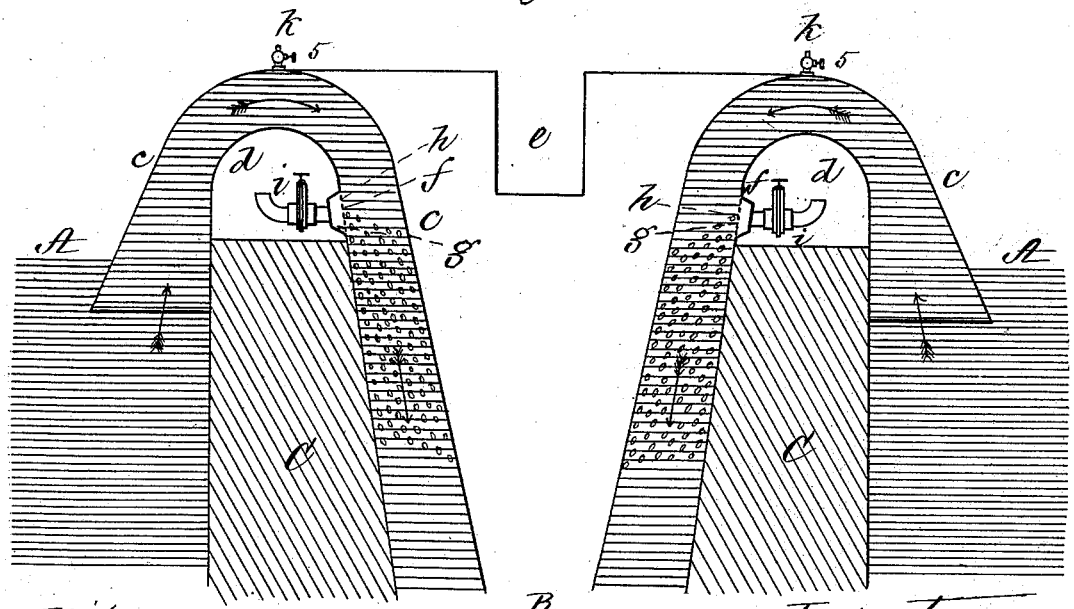

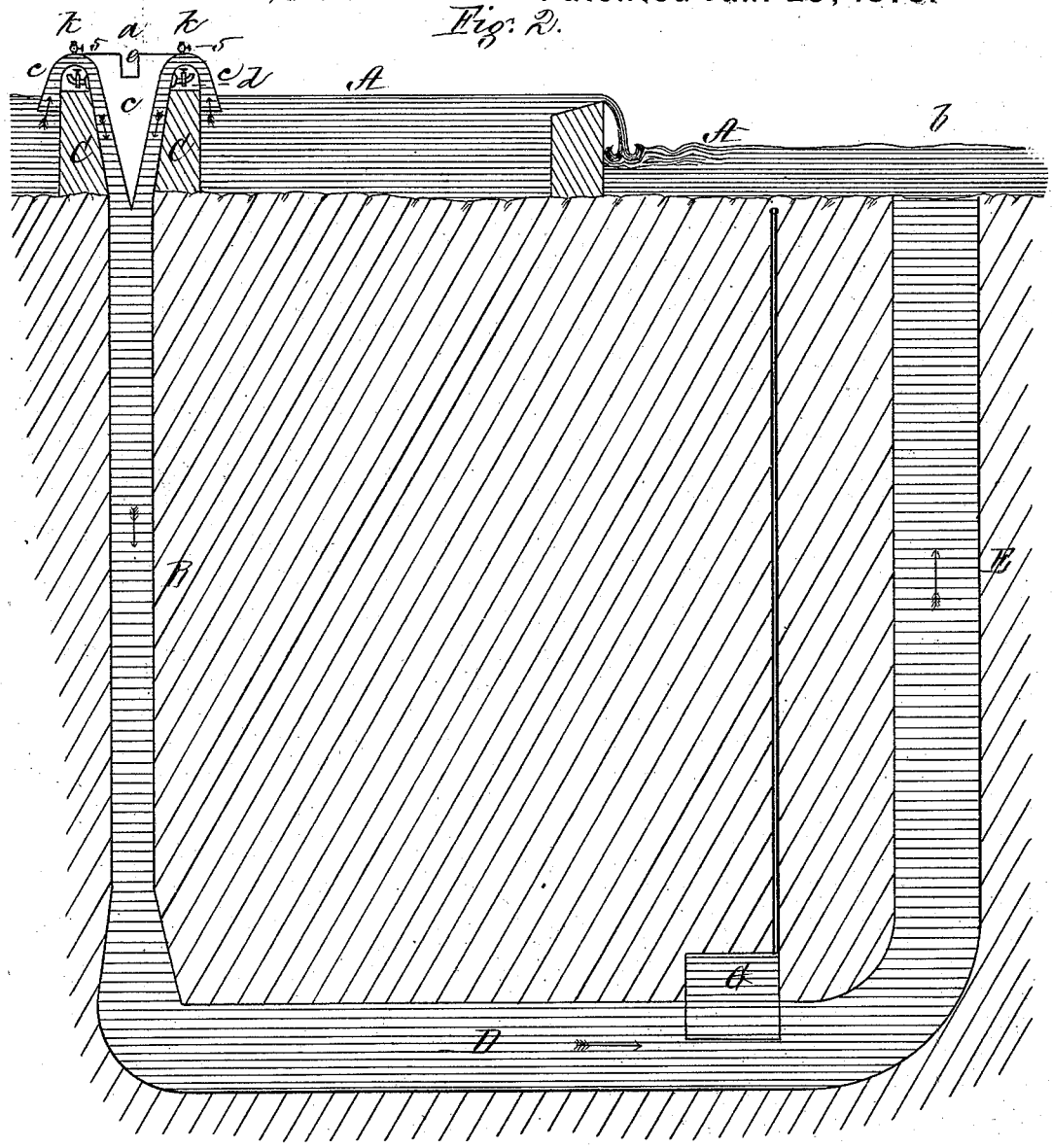

UNITED STATES PATENT OFFICE.

JOSEPH P. FRIZELL, OF BOSTON, MASSACHUSETTS.

IMPROVEMENT IN METHODS OF COMPRESSING AIR.

Specification forming part of Letters Patent No. 199,819, dated January 29, 1878; application filed November 27, 1877.

*To all whom it may concern:*

Be it known that I, JOSEPH P. FRIZELL, of Boston, in the county of Suffolk and State of Massachusetts, have invented a new Method of Compressing Air, of which the following is a full, clear, and exact description, reference being had to the accompanying drawings, making part of this specification, in which—

Figure 1 is a plan representing a water-fall, the water being employed as an agent for the compression and conveyance of air into a suitable receiver, in which it accumulates, and from which it may be drawn and utilized as a power. Fig. 2 is a vertical section on the line $x\ x$ of Fig. 1. Fig. 3 is a sectional detail enlarged.

Air has heretofore been compressed for use as a motive power by engines adapted for the purpose and known as "compressors," which have been driven by steam, water, &c., their construction involving a considerable outlay, and their management requiring the attendance of skilled labor.

My invention has for its object to provide a means of compressing air without the employment of compressing-engines, water-wheels, &c., and thus avoid the loss of power incident to their use, and also that resulting from the heating of the air during the operation of compressing it.

My invention consists in compressing air by introducing it within a column of water descending through a shaft or pipe, and flowing through a tunnel into and out of an ascending shaft or pipe, the air compressed in the descending shaft escaping into a suitable receiver located at or communicating with the top of the tunnel, in which it is accumulated, and from which it may be conducted to any desired point by a pipe, to be utilized as a power for various purposes, as it is known that air drawn into a current of water descending through a vertical shaft or pipe with a velocity greater than that with which air-bubbles would rise in still water will be carried down with the descending column, and subjected to a pressure corresponding to the depth attained.

My invention also consists in certain details of construction, to be hereinafter described.

To enable others skilled in the art to understand and use my invention, I will proceed to describe the manner in which I have carried it out.

In the said drawings, A represents a stream of water, with a fall caused by a dam or otherwise. At a point, $a$, to one side or in the bed of the stream is sunk a vertical shaft, B, the top of which is provided with an annular curb, C, of masonry, projecting above the level of the stream. From the bottom of this shaft B is driven a tunnel, D, which extends to the bottom of another vertical shaft, E, sunk in the bed or at the side of the stream, at $b$, on the down-stream side of the fall, and a suitable distance below or down-stream of the point $a$, the diameter of the tunnel D and that of the shaft E being preferably larger than that of the shaft B, (see Fig. 2,) the water from the stream being caused to flow down the shaft B through the tunnel D, and thence return to the stream by passing up the shaft E.

Upon the top of the curb C is located an annular siphon, $c$, of boiler-iron, the center of which is in line with the center of the shaft, the space between the under side of the sipon and the upper surface of the curb C forming a circular gallery, $d$, from which the air is introduced into the descending column of water, in a manner presently to be described. This gallery extends around the top of the curb, and is provided with an aperture or manhole, $e$, at its top, by which access may be had to its interior.

Within and extending around this gallery is a closed chamber, $f$, the wall $g$ of which adjacent to the descending column of water is provided with a series of minute perforations, $h$, formed close together, this chamber being supplied with air by means of one or more gates or valves, $i$, connected therewith, whereby the quantity of air admitted is regulated, as desired.

The perforated wall $g$ of the chamber $f$ is located on the descending branch of the siphon, where its direction is nearly vertical, at which point the pressure of the water in the siphon is less than that of the external air, and consequently the latter will flow into the shaft B through these perforations, and even should the external water rise as high as the top of the gallery, the internal pressure will be less than the external at this point.

$k\ k$ are nozzles communicating with the top of the siphon, and provided with valves 5, and to these nozzles an air-pump may be connected when it is desired to exhaust the air therefrom.

The bottom of the tunnel is horizontal, and its top rises slightly from the foot of the shaft B to a receiver, G, (located at the top of the tunnel,) for containing the air which is carried down and compressed by the column of water descending through the vertical shaft B, the compressed air being conducted from the receiver by a suitable pipe, $l$, to any desired point where it is to be utilized as a power.

The inclination of the top of the tunnel is not essential; but I prefer to incline it upward toward the receiver, as the passage of the air to the receiver is thereby facilitated.

The length of the tunnel will depend on the position of the air-receiver, which should be far enough from the descending shaft B to admit of the ascent of the air-bubbles to the top of the tunnel before reaching the receiver.

The descending shaft is carried to a depth corresponding to the amount of pressure required. The exact pressure on the air in the receiver will be that due the depth of water as measured from the surface of the water in the receiver to the surface of the water in the stream at the mouth of the ascending shaft.

When it is desired to commence the operation of compressing the air, an air-pump is applied to the nozzles $k\ k$ and their valves 5 opened, when, after the air is exhausted from the siphon, the water from the stream is caused by the atmospheric pressure to rise in the siphon and flow down the descending shaft B, when the valves 5 of the nozzles are closed, the water flowing down the shaft with a velocity due to the entire head or fall of the water.

The gate $i$, controlling the admission of air into the gallery-chamber $f$, is now partially or wholly opened, admitting air to the chamber, and thence through the perforated wall $g$ into the descending shaft, where it is carried by the water down into the tunnel D, being subjected to a continually-increasing pressure in its descent. The air now rises to the top of the tunnel, and is conducted into the receiver, from which it may be drawn off, when required for use as a power, by opening a cock or valve in the pipe $l$.

The velocity of the water down the shaft B, through the tunnel D, and up the shaft E is regulated by the quantity of air admitted through the gates $i$; and should it be desired to stop the flow of the water, it can be readily done by allowing the air to enter the summit of the siphon by opening the valve 5 in one or both of the nozzles $k$.

It is obvious that the power due to the rise and fall of the tides could be utilized in an apparatus constructed in accordance with my invention, and to adapt such apparatus thereto it would be necessary to make both shafts of equal diameter, since each must alternately serve as the ascending and descending shafts. Each shaft would be provided with a siphon, the top of the gallery underneath which should extend above the highest level of the tide, and the entrance to the siphon below the lowest level thereof, the water being subjected to the action of the siphon both at its entrance to and exit from the apparatus.

The dam or embankment separating the tidal basin from the general sea-level would lie between the two entrances, as in the case of an ordinary water-course.

I am aware that air has been compressed heretofore by water-power, by means of machines called "compressors," the power being applied thereto by water-wheels. Air has also been compressed or rarefied to an extent sufficient for creating a blast or draft by a jet of water driven through a tube to which the air has access, as exemplified in the jet air-pump, and in the "trumpet" sometimes used in iron mines to create a blast for the "Catalan" forge. Air has also been compressed to a tension corresponding to the total fall available at the locality, without the intervention of pistons or water-wheels, by allowing the water to alternately enter and escape from the compressing-chamber; and air has been compressed by the direct action of water to a tension greater than that due the head or fall by employing the momentum of the mass of water contained in a long pipe, the water being alternately set in motion and brought to rest by a peculiar arrangement of valves, the compressed air, by its expansion, forcing a portion of the water to a height greater than the fall acting on the machine. This action is exemplified by Montgolfier's hydraulic ram and the air-compressors used at the Mont Cenis tunnel.

My invention employs a principle different from that involved in any of the above-recited methods, and has for its object the compression of air to any required degree of tension, whether the head be great or small, and also to avoid the loss of power due to the development of heat in the air during compression, without the intervention of water-wheels, cylinders, pistons, compressing - chambers, valves, or mechanism of any kind, except the valves and mechanism for initiating and suspending the motion of the water, and for controlling the admission of air.

What I claim as my invention, and desire to secure by Letters Patent, is—

1. The method of compressing air by introducing it within a column of water descending through a shaft or pipe, and flowing through a tunnel into and out of an ascending shaft or pipe, the air compressed in the descending shaft escaping into a suitable receiver located at or communicating with the top of the tunnel, from which it is taken to the point where it is to be used, substantially as described.

2. The siphon $c$, in combination with a descending shaft, B, tunnel D, ascending shaft E, receiver G, and pipe $l$, as and for the purpose set forth.

3. The gallery $d$, extending around and beneath the summit of the siphon $c$, in combination with a means of admitting air therefrom into the column of water in the descending shaft B, substantially as described, for the purpose specified.

4. The chamber $f$, with its perforations $h$, and gate or valve $i$, in combination with the siphon $c$ and descending shaft B, substantially as and for the purpose described.

Witness my hand this 20th day of November, A. D. 1877.

JOSEPH P. FRIZELL.

In presence of—
P. E. TESCHEMACHER,
N. W. STEARNS.